United States Patent
Tylicki et al.

(10) Patent No.: US 10,865,980 B1
(45) Date of Patent: Dec. 15, 2020

(54) CONFIGURABLE SECURITY LIGHT

(71) Applicant: HeathCo LLC, Bowling Green, KY (US)

(72) Inventors: Scott Blaise Tylicki, Bowling Green, KY (US); Apollo Paul Paredes, Livonia, MI (US); Kenneth Earl Ramsey, Bowling Green, KY (US); Amer Salihovic, Bowling Green, KY (US); Leeman Elliot Stevens, Bowling Green, KY (US); Bradley Thomas Moore, Woodburn, KY (US)

(73) Assignee: HEATHCO LLC, Bowling Green, KY (US)

( * ) Notice: Subject to any disclaimer, the term of this patent is extended or adjusted under 35 U.S.C. 154(b) by 93 days.

(21) Appl. No.: 16/204,747

(22) Filed: Nov. 29, 2018

Related U.S. Application Data

(60) Provisional application No. 62/592,190, filed on Nov. 29, 2017.

(51) Int. Cl.
| | |
|---|---|
| *F21V 33/00* | (2006.01) |
| *F21V 21/116* | (2006.01) |
| *F21V 17/00* | (2006.01) |
| *F21V 17/06* | (2006.01) |
| *F21V 21/28* | (2006.01) |
| *H02G 3/08* | (2006.01) |
| *F21V 23/04* | (2006.01) |

(Continued)

(52) U.S. Cl.
CPC .......... *F21V 33/0076* (2013.01); *F21V 5/04* (2013.01); *F21V 17/002* (2013.01); *F21V 17/06* (2013.01); *F21V 21/116* (2013.01); *F21V 21/28* (2013.01); *F21V 23/0471* (2013.01); *H02G 3/08* (2013.01); *F21V 23/0464* (2013.01); *F21W 2131/10* (2013.01); *F21Y 2115/10* (2016.08)

(58) Field of Classification Search
CPC ...... F21V 33/0076; F21V 5/04; F21V 17/002; F21V 17/06; F21V 21/116; F21V 21/28; F21V 23/0471; F21V 23/0464; H02G 3/08; F21Y 2115/10; F21W 2131/10
USPC ......................................................... 362/244
See application file for complete search history.

(56) References Cited

U.S. PATENT DOCUMENTS

| | | |
|---|---|---|
| 5,410,461 A | 4/1995 | Petzl |
| 6,100,803 A | 8/2000 | Chang |

(Continued)

FOREIGN PATENT DOCUMENTS

| | | |
|---|---|---|
| CN | 202091955 | 2/2011 |
| CN | 10475176 | 10/2014 |

(Continued)

OTHER PUBLICATIONS

English translation of JP 5851062 to Ito (Year: 2016).*

*Primary Examiner* — Rajarshi Chakraborty
*Assistant Examiner* — Hana S Featherly
(74) *Attorney, Agent, or Firm* — Middleton Reutlinger

(57) ABSTRACT

A configurable security light is described. The configurable security light may include a first and a second separable lamp head, each of which may include both an upper illumination segment and a lower illumination segment. The lower illumination segment may be affixed to the upper illumination segment through a multi-axis hinge so that the lower illumination segment may be redirected to a secondary light output direction as compared to a primary light output direction of the upper illumination segment.

17 Claims, 5 Drawing Sheets

(51) Int. Cl.
*F21V 5/04* (2006.01)
*F21Y 115/10* (2016.01)
*F21W 131/10* (2006.01)

(56) References Cited

U.S. PATENT DOCUMENTS

| | | |
|---|---|---|
| 7,934,854 B2 | 5/2011 | Anglikowski et al. |
| 8,461,991 B2 | 6/2013 | Botha |
| 8,901,825 B2 | 12/2014 | Reed |
| 9,402,294 B2 | 7/2016 | Holland et al. |
| 9,618,174 B2 | 4/2017 | Jungwirth et al. |
| 2012/0262069 A1* | 10/2012 | Reed .................... H05B 47/105 |
| | | 315/130 |
| 2015/0131285 A1 | 5/2015 | Lee |
| 2017/0003008 A1 | 1/2017 | Ito |
| 2017/0184289 A1 | 6/2017 | Nolan et al. |

FOREIGN PATENT DOCUMENTS

| | | | | |
|---|---|---|---|---|
| CN | 104075196 | | 10/2014 | |
| JP | 5851062 B1 | * | 2/2016 | .............. F21V 21/15 |

* cited by examiner

CONFIGURABLE SECURITY LIGHT

BACKGROUND

Outdoor security lights are generally known in many forms and typically include a lamp head which is secured to a mounting base for illumination outdoors. For example, the security light may have a light sensor and a motion sensor which causes the security light electronics to illuminate the lamp head either when dusk is detected and when motion is detected within a field of view.

Outdoor security lighting is commonly implemented utilizing opposing standard sockets which receive typically a, PAR38 or other illumination source. The sockets to which light sources are electrically attached are typically mounted on a multi-directional knuckle joint and are positioned on opposite sides of a mounting surface. These connectors historically have allowed rotation of a first connector relative to the mounting surface while also providing rotation of a second connection relative to the first. Standard designs however have limited movement constraints and also fixed photometric footprints from each of the illumination sources. These are significant drawbacks to the implementation of known security lighting.

SUMMARY

This specification is directed generally to an outdoor security light that has a configurable security light illumination source. Some implementations are directed towards a configurable security light that has a first and a second separable lamp head. For example, some implementations may include a first lamp head that has a first upper illumination segment connected to a first lower illumination segment. The connection of the first separable lamp head to a mounting base may as well, in some implementations, be by a pivoting, single or double hinge connection.

Other implementations may, for example include a second lamp head that has a second upper illumination segment connected to a second lower illumination segment. The connection of the second separable lamp head to a mounting base may as well, in some implementations, be by a similar pivoting, single or double hinge connection.

Some implementations described herein are directed to a first separable lamp head that includes, for example, a first upper illumination segment that may be articulated relative to the first lower illumination segment in a first and a second axis.

In some implementations, the device may be directed to a second separable lamp head that includes, for example, a second upper illumination segment that may be articulated relative to the second lower illumination segment in a first and a second axis.

In implementations, the first upper illumination segment may move relative to the first lower illumination segment in the first and the second axis where the axes are orthogonal to each other.

In some implementations, the first upper and the first lower illumination segments may each have a plurality of LEDs as the illumination source. In implementations, the first upper illumination segment is connected to the first lower illumination segment by a multi-axis hinge interposed there between. In other implementations, separate structures can provide the relative movement between the first upper and first lower illumination segments.

In some implementations, the second upper and the second lower illumination segments may each have a plurality of LEDs as the illumination source. In implementations, the second upper illumination segment is connected to the second lower illumination segment by a multi-axis hinge interposed there between. In other implementations, separate structures can provide the relative movement between the second upper and second lower illumination segments.

The above description is provided as an overview of some implementations of the present disclosure. Further description of those implementations, and other implementations, are described in more detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a configurable security light will now be described by way of examples. These embodiments are not to limit the scope of the claims as other embodiments of a configurable security light will become apparent to one having ordinary skill in the art upon reading the instant description. Non-limiting examples of the present embodiments are shown in figures wherein:

DETAILED DESCRIPTION

Figure 1:
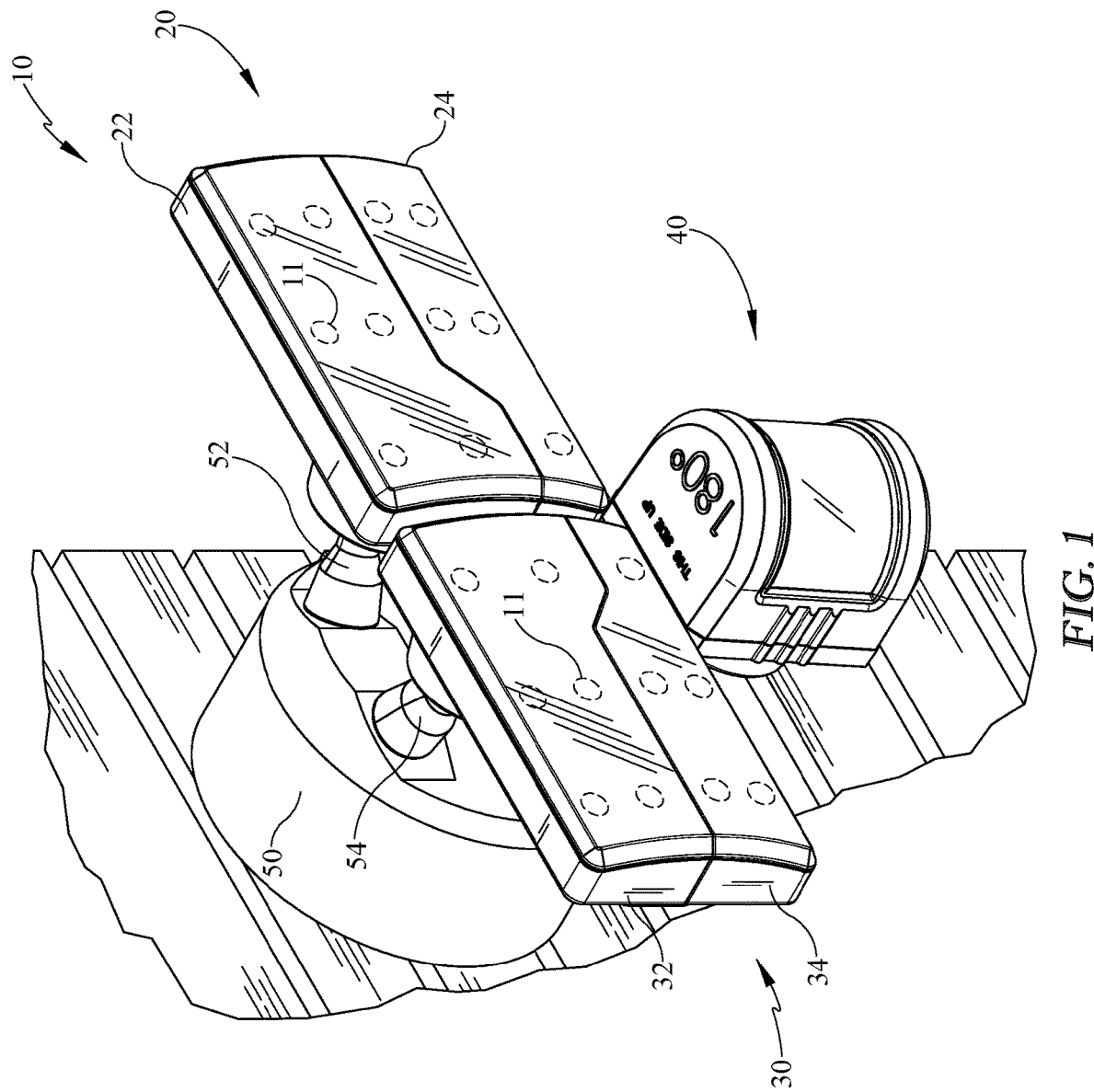
FIG. 1 illustrates a perspective view of an implementation of the security light described herein.

It is to be understood that a configurable security light is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Turning to the figures, FIG. 1 illustrates an example of a security light described herein. Included in this implementation is a first separable lamp head 20 and a second separable lamp head 30. Each of the first and second separable lamp heads 20, 30 are connected to a mounting base 50 by first and second control arms 52, 54, detailed in FIG. 4.

Figure 4:
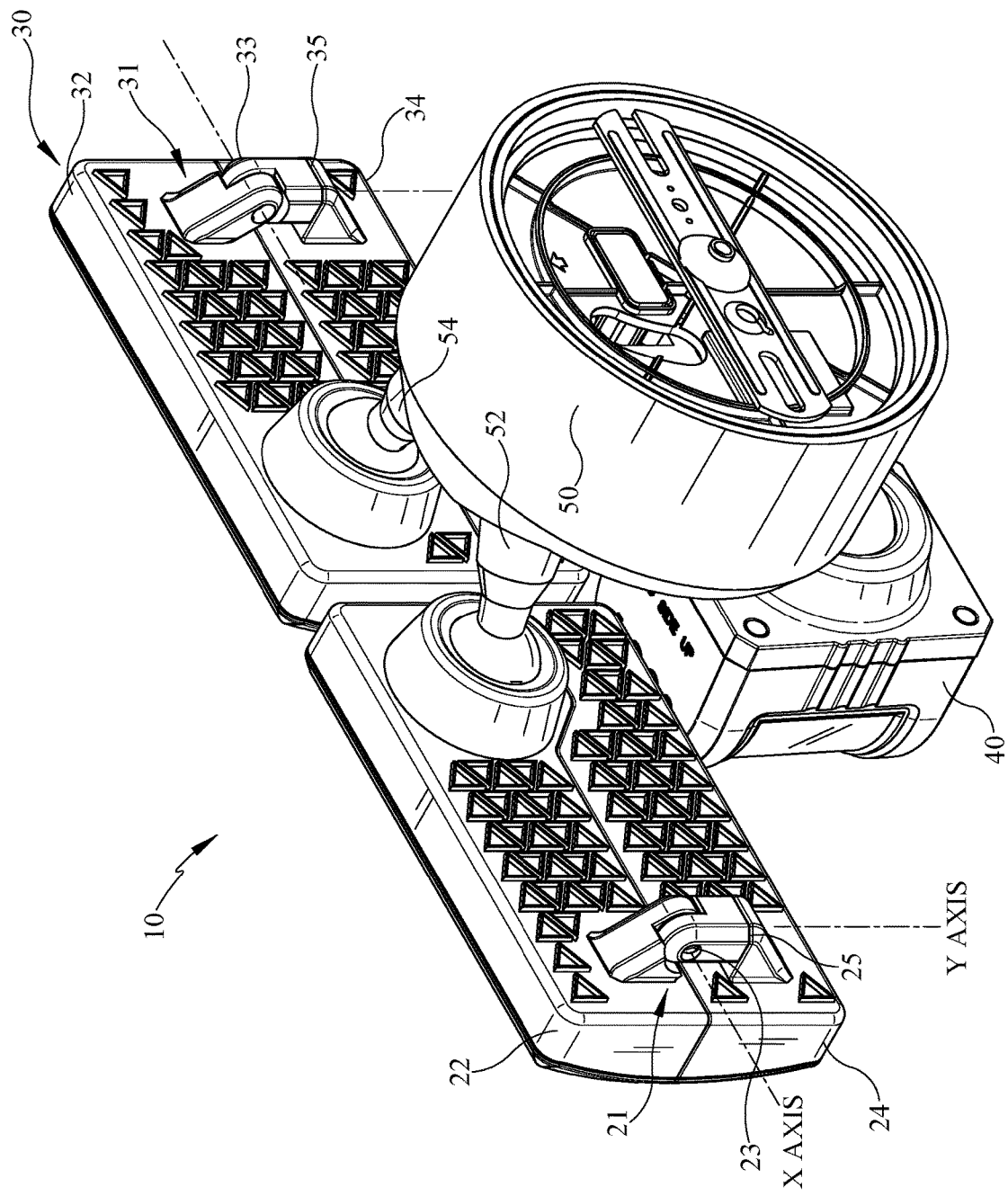
FIG. 4 illustrates a rear perspective of the security light described herein.

The first separable lamp head 20 includes a first upper illumination segment 22 and a first lower illumination segment 24. In some implementations, the first upper illumination segment 22 is hingedly connected to the first lower illumination segment 24 by a first multi-axis hinge 21, as is shown in FIG. 4. The first multi-axis hinge 21 can include a first axis hinge 23 and a second axis hinge 25. In some implementations, the first axis hinge is movable in the X axis direction. In some implementations, the second axis hinge 25 is movable in the Y axis direction.

Figure 2:
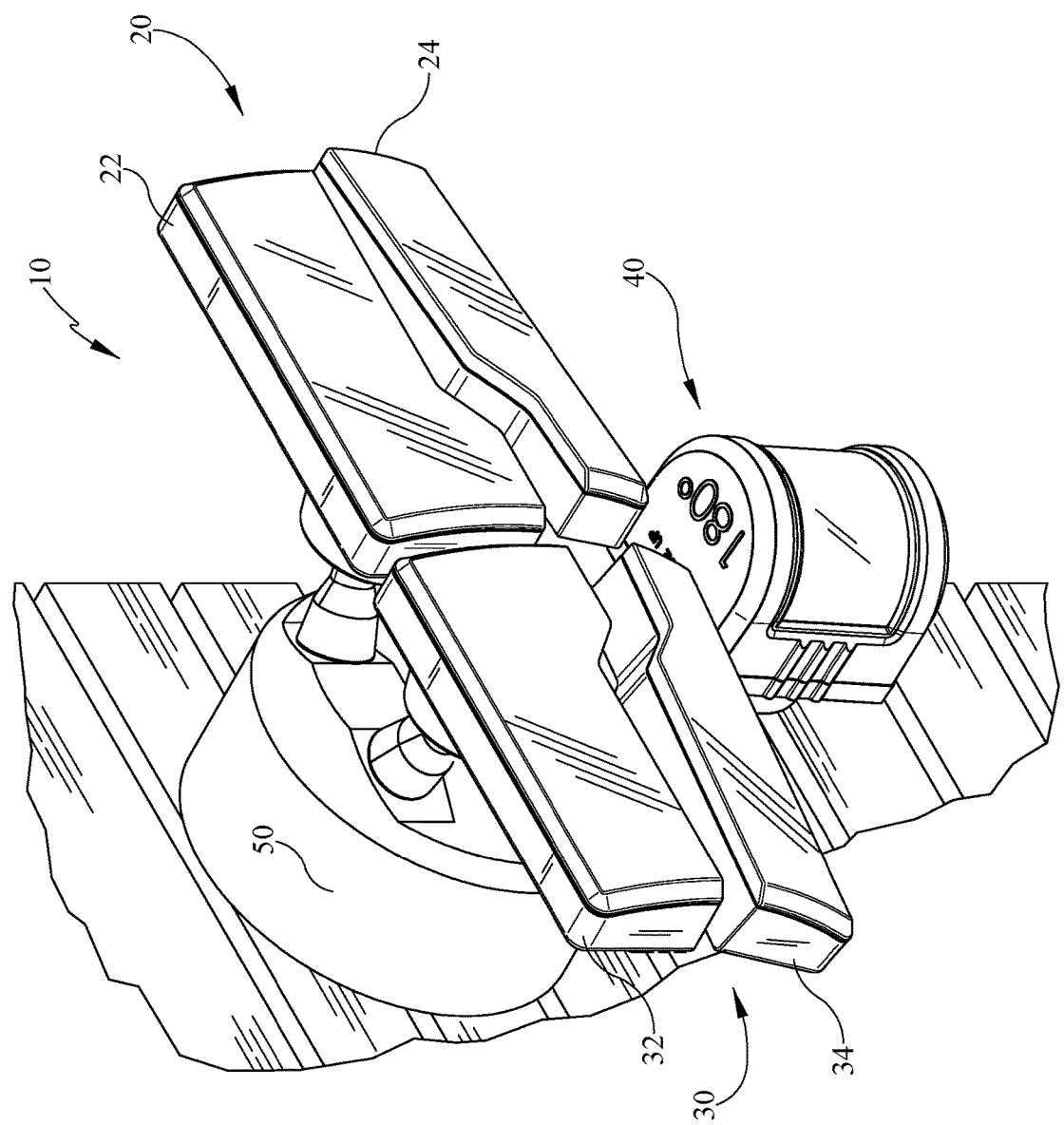
FIG. 2 illustrates a perspective view of the security light described herein where the first and the second separable lamp heads are in a deployed and separated position.
Figure 3:
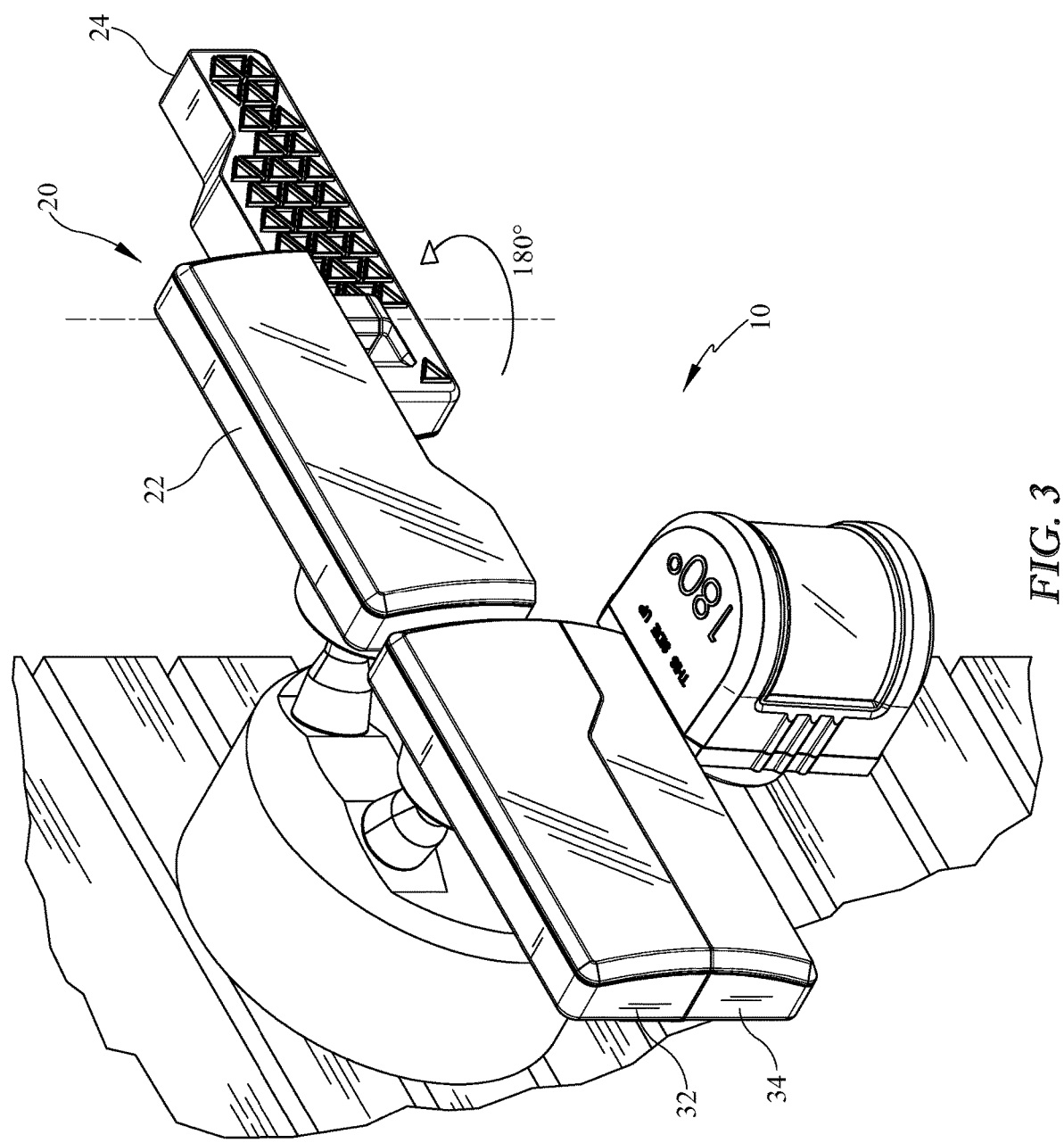
FIG. 3 illustrates the security light with the first lower illumination segment rotated approximately 180 degrees relative to the first upper illumination segment.

In implementations, the first axis hinge 23 movable along the X axis allows the first lower illumination segment 24 to move relative to the first upper illumination segment 22 so that it separates the two illumination segments from a predefined adjacent combined position, as shown in FIG. 1, to a variably deployed illumination position, as illustrated in FIGS. 2 and 3. Such variable deployed illumination positions allows the user to individually modify the photometric output of the first separable lamp head 20 to a variable photometric footprint. Such variability may allow individual photometric output to include both forward throw and up to full rearward throw, as is depicted in FIG. 3, wherein the first lower illumination segment 24 is rotated nearly 180 degrees relative to the first upper illumination segment 22.

In some embodiments, the second separable lamp head 30 may be modeled similarly as the first separable lamp head 20, utilizing a second upper illumination segment 32 and a second lower illumination segment 34. As depicted in the various embodiments, the second separable lamp head 30 may also include multi-axis hinge 31 and operable similar to the multi-axis hinge 21 of the first separable lamp head 20. First axis hinge 33 and second axis hinge 35 may be incorporated within the multi-axis hinge 31.

In various implementations, the multi-axis hinges 21 and 31 may be a combined first axis hinge and second axis hinge interposed between the upper and lower illumination segments. In embodiments, variations of the multi-axis hinge may be implemented and include separate structures for relative movement in the first axis and the second axis. In embodiments, these separate multi-axis hinge structures could be located on different sections of the upper illumination segment and lower illumination segment. For example, a first hinge could be provided on a first part between the upper illumination segment and the lower illumination segment. In other examples, a combined multi-axis hinge as depicted in the figures may be utilized.

In embodiments, as shown in FIG. 4, the first axis hinge 23, 33 may allow rotation of the lower illumination segment 24, 34 relative to the upper illumination segment 22, 32 about the X-axis. In some aspects, the first axis hinge 23, 33 may allow rotation of up to at least about 45 degrees or more between the upper illumination segment 22, 32 and lower illumination segment 24, 34. The displacement along the X-axis or first axis, as shown, can be varied according to illumination requirements and/or design of the implemented first axis hinge 23, 33. However, the hinge design shown should not be considered limiting and any variation and displacement along such axis may be supported including positive and negative displacements along the axis.

In embodiments, as shown in FIG. 4, the second axis hinge 25, 35 may allow rotation of the lower illumination segment 24, 34 relative to the upper illumination segment 22, 32 about the Y-axis. In some aspects, the second axis hinge 25, 35 may allow rotation of up to about 180 degrees or more between the upper illumination segment 22, 32 and the lower illumination segment 24, 34. The displacement along the Y-axis or second axis, as shown, can be varied according to illumination requirements and/or design of the implemented second axis hinge 25, 35. However, the hinge design shown should not be considered limiting and any variation and displacement along such axis may be supported including positive and negative displacements along the axis.

Displacement of the lower illumination segment relative to the upper illumination segment may include both positive and negative displacement for both the first and the second axis. Further, any listed displacement provided herein is included merely for explanation in correlation with the figures as neither any minimum or maximum first axis displacement or second axis displacement is to be construed herein.

In embodiments, the multi-axis hinges 21, 31 may include a separated first axis hinge and a second axis hinge non-integrated with the first axis hinge. In other embodiments, the multi-axis hinges 21, 31 may integrated into singular structures. As depicted in the example of FIG. 4, first axis hinge 23 allows the lower illumination segment to hinge downward away from the upper illumination segment by virtue of the hinge pin and/or connection. Rotation of the first axis hinge 23 allows the lower illumination segment to pivot downward. Further, second axis hinge 25 allows rotation of the lower illumination segment about the second axis wherein the first axis and the second axis may be, in some implementations, orthogonal to each other. Alternative axis configurations may be readily implemented.

For example, a first hinge may be provided which is separate from the second hinge and or positioned in a differing location on the upper and lower illumination segments. Similarly, variations of multiple axes hinges may be incorporated as an interface between the upper and lower illumination segments. Such implementations may variously include movement of the lower illumination segment relative to the upper illumination segment in both a first axis displacement and a second axis displacement.

In various implementations, the first and second separable lamp heads 20, 30 may be connected to the base mounting 50 via first and second ball joint connecting arms 52, 54. Each respective ball joint connecting arm 52, 54 may be received in respective casing 51, 53 formed on the respective rear surface of the first and second separable lamp heads 20, 30. Alternatively, the casings could be placed on variable positions of the first and second separable lamp heads, either on the upper illumination segment, lower illumination segment or individual and separate connections to each first and second upper and lower illumination segments.

In some embodiments, the first and second separable lamp heads 20, 30 may be substantially rectangular when positioned, as depicted in FIG. 1, in a predefined adjacent combined position. The movement between respective upper illumination segments 22, 32 relative to the lower illumination segments 24, 34 allows the illumination output to be significant modified as compared to the predefined adjacent combined position for each of the first and second separable lamp heads 20, 30 shown in FIG. 1. For example, each of the lower illumination segments 24, 34 may be moved relative to a first and a second axis with respect to the upper illumination segments 22, 32. By providing such varied relative movement between the two illumination segments, wide ranging modification of the illumination output may be achieved.

Both the first separable lamp heads 20, 30 may include a plurality of LEDs 11 mounted therein which may be electrically controlled by a control and/or driver circuit either at the individual LED positions, by a combined LED lighting driver control or by segmented illumination driver/control for the individual first and second upper and lower illumination segments. In some implementations, the LEDs may be individually controlled or may be controlled by each segment for, among some aspects, color and light intensity. Such driver control could be through standard known modulation and or alternatively voltage/current control techniques. Driver control circuitry for LED illumination may be incorporated at the individual respective first and second upper and lower illumination segments, at the individual emitter or may alternatively be provided in a combined LED driver controller which could be positioned within the fixture, singular illumination segment, mounting housing or junction box.

The LEDs of each upper and lower illumination segments may be covered with a lens which may, in embodiments, incorporate the entire separate upper or lower illumination segment as depicted in the figures. In alternative configurations, an individual lens maybe provided at the LED unit level to provide particularized light output at the LED level.

As shown in the figures, and in the depicted embodiment, both the upper illumination segment and lower illumination segment may be individually covered with a lens. As depicted in the example of the figures, when combined as shown in FIG. 1, the individual first and second separable lamp heads 20, 30 may form a rectangular lamp head but be separable into separable first and second upper illumination segments and lower illumination segments which individually are non-rectangular. As a result, the individual segments may be specialized for their individual photometric output requirements. Further, such rectangular predefined adjacent combined position, as shown in FIG. 1, allows the user to maximize light intensity and output when configured for direct outward illumination. In implementing light output modification by separating the lower illumination segment from the upper illumination segment using the multi-axis hinge, specialized and user required light output may be implemented, such as directly light around a corner of a house while also directly light outward form the mounting surface.

In addition, a sensor head may be electronically and/or electrically connected to the mounting base. As shown in the figures, sensor head 40 may extend outwards and have fully operational motion sensing electronics using known techniques. Sensor head 40 may incorporate the use of multiple or single mounted PIRs, radar, sonic and or laser range finding, among various technologies known to electronically determine movement of people and/or animals. Such technology may include heat signatures, range finding and or distance measurement algorithms and other techniques which may be electronically implemented in the sensor head, combined with electronics of the security light 10 or positioned off-fixture. Sensor head 40 may also be mounted, in embodiments, directly onto the mounting base or may be separable from the base and communicate directly to control and/or other electronics of the security light 10 so that the sensor head may be positioned separately from the mounted position of the security light. By electronically connecting the sensor head to the control electronics of the configurable security light presently described, both wired and non-wired connections can be supported.

In embodiments, the security light 10 may incorporate additional sensing devices such as optical sensors to determine ambient light levels such as a photocell, allowing the security light to come on at dusk. Such optical sensors may also be combined with other location finding techniques allowing the security light 10 to determine location and time zone and correlating location with pre-determined or calculated sunset and sunrise times. Alternatively, the lighting controller may have associated electronics and memory to allow programming of customer/installed desired on/off times after dusk, illumination ON times after sensing motion, full dusk to dawn illumination, partial or lower light intensity dusk to dawn illumination for the entire period or for user defined periods, modification of intensity levels, or other customer desirable modifications. Further, the controller may further be configured to sense a hard 'reset' or active 'ON' by manual switching OFF then ON of the power at the switch by the user. All of such features may be incorporated into controller programming where a microprocessor executes instructions stored in an associated memory, or in alternative or combined configurations, some or all features may be implemented with associated circuit controls incorporated into the controller.

In some implementations, it may be desirable to allow the User to reprogram the delay times, sensitivity of the PIR and or motion sensors, light intensity levels and color, color temperature, sensitivity and or triggering of the optical sensors for dusk and dawn determination, as well as ON times and lower illumination times and or levels. Such reprogramming may be implemented with switches at the security light, or may be readily implemented with associated reprogramming by a user through a mobile programming device, such as a phone or dedicated remote control. Such reprogramming capability may require implementation of communication channels for both transmission and receiving commands from a remote source. Corresponding applications may be implemented for modification of such features on a user mobile device.

For example, a user may select and/or modify ON time after the motion sensor detects motion while also selecting the illumination intensity, such as dimming the illumination levels slowly during change in state. In alternative embodiments, the user may select and/or modify the specific colors utilized by the multiple illumination segments, if supported, and may include user modification of the color temperature. Such modifications may be implemented either for each illumination segment or individually for a single illumination segment.

In some embodiments, user specified alternative modifications may further include flashing or blinking lights of each or all illumination segments under predefined conditions. For example, in some implementations, one or more illumination segments may be programmed to flash intermittently to indicate an alert or warning condition, such as the detected interruption of power. Alternatively, a flashing alert or warning condition may be implemented by programming or user adjustment of controls by one or more illumination segments upon detection of motion while concurrently increasing illumination intensity of all illumination segments.

In implementations, LEDs 11 may be connected to a power supply which provides electrical power to each LED. The power supply utilized in security lighting may be a standard converter to provide adequate and appropriate electrical supply to the individual LEDs via driving circuits, as discussed. The power supply may accept standard 110V AC line voltage and modify it accordingly to provide to the individual LEDs. Such modifications may include AC to DC conversion, PWM drivers, smoothing or chopping circuits and the like as are well-known in the art to provide adequate power to the LEDs.

In some implementations, the LEDs 11 may further include color LEDs to provide variability in color and/or color temperature. Color may be implemented by various techniques including known color mixing of predefined color LEDs, modifying color output using luminescent materials, driving LEDs at varying intensity to meet color output requirements, among other known implementations.

In implementations, the configurable security light described herein may incorporate such sensors described or may be a switched luminaire with no associated sensors. In implementations, such a configurable security light would be modifiable by the user through modification of the displacement of the first and second lower illumination segment relative to the respective first and second upper illumination segment, as described herein, through manipulation of singular or multi-axis hinges Various implementations for drivers of the LEDs may be utilized including microprocessors, the linear AC drivers are constant current regulators. In other embodiments, the linear AC drivers are ASICs. Other drivers may be used. The LEDs may be provided as arrays, individual emitters, any of which may be directly addressable and hence drivable by control and/or micro-processors and included programming stored on available and accessible memory. Such may include in implementations, current regulators, voltage regulators, micro-controllers and other known circuitry to maintain illumination levels and other characteristics of the LEDs.

Figure 5:
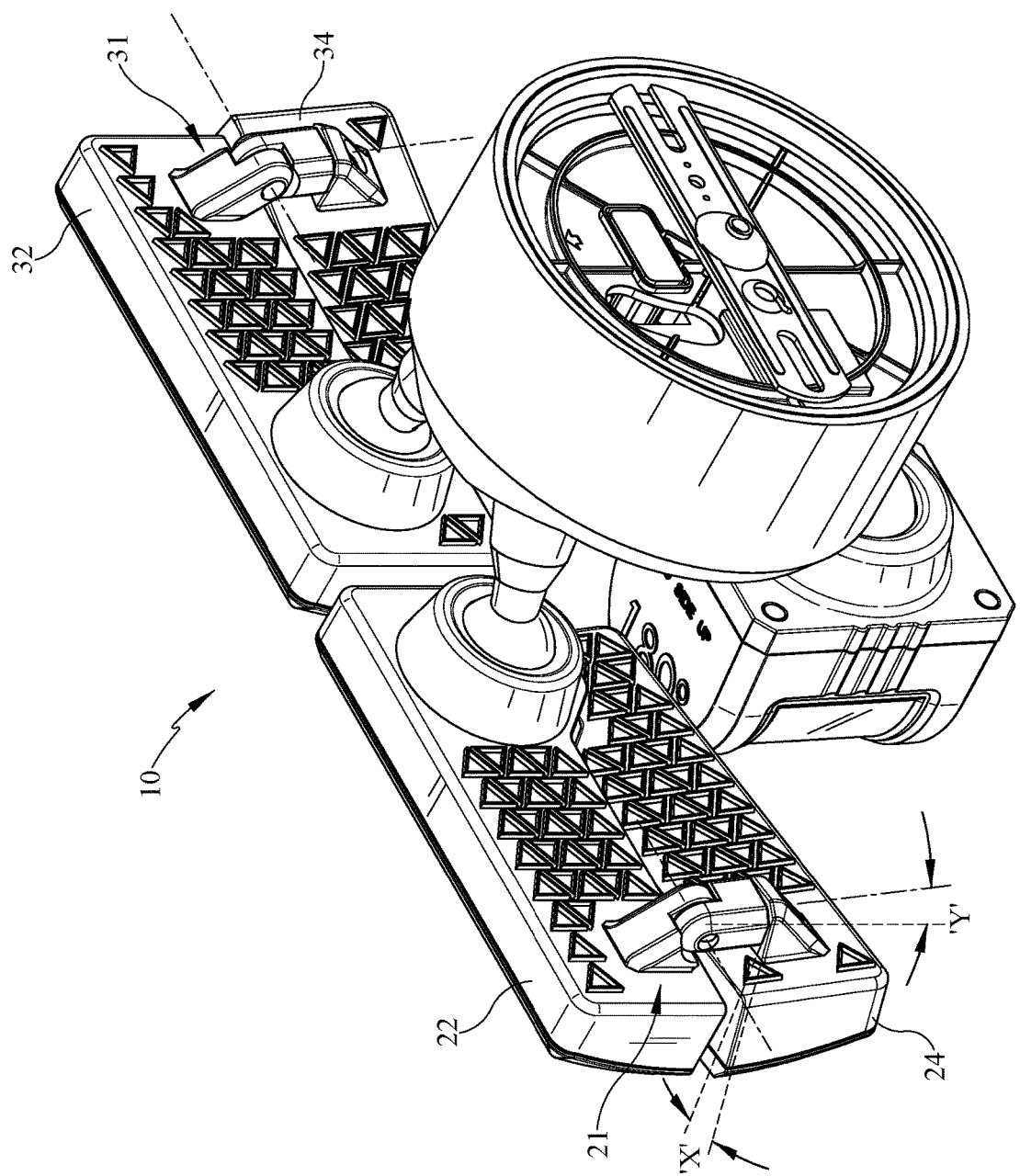
FIG. 5 illustrates a rear perspective of the security light in the deployed position of FIG. 2.

As depicted in FIG. 2, the first and second lower illumination segments 24, 34 have been deployed downward and away from the first and second upper illumination segments 22, 32. Thus, in the deployed condition shown in FIG. 2, light output from the security light has been modified to provide both outward illumination from the mounting surface from the upper illumination segments, but also additional outward and downward illumination from the lower illumination segments. Hence, the lower illumination segments have been moved downward to provide displacement by an amount 'Y' along the Y axis and displaced outward away from the fixture along the X axis by an amount 'X' as depicted in FIG. 5.

Variation of the light output for the security light 10 may include wide variation in direction, such as is depicted in FIG. 3, wherein the first lower illumination segment 24 is rotated by nearly 180 degrees to direct light rearward from the mounting position of the configurable security light 10. First lower illumination segment 24 is rotated about second axis hinge 35, for example a Y-axis hinge, to provide rearward directed illumination by the security light. In various implementations, combined with a secondary sensor, not shown, which is similarly positioned in the rear illumination direction and which communicates to the security light through wireless communication. In some embodiments, the wireless connection may be established according to various wireless standards such as Wi-Fi, Bluetooth, or ZigBee. Other types of wireless links may be used. In other implementations, both the first and the second lower illumination segments may be directed towards varied illumination output areas based upon coverage of multiple sensors thereby allowing the security light to illuminate a configurable and wide area.

Mounting base 50, shown in FIG. 4, may be mounted directly to a junction box or other electrical mounting connection as known in the art. Typical wiring and mounting bars may be provided in aspects to allow for direct mounting to a surface of a building. In variations, direct wall mount or ceiling mount may be provided by varying the position of the mounting base 50 and control arms 52, 54.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A configurable security light comprising:
   a mounting base electronically connected to a sensor head;
   a first and second support arm extending from the mounting base;
   a first separable lamp head affixed to the first support arm and a second separable lamp head affixed to the second support arm;
   the first separable lamp head having a first upper illumination segment hingedly connected to a first lower illumination segment;
   the first upper illumination segment and the first lower illumination segment each have a plurality of LEDs;
   the second separable lamp head having a second upper illumination segment hingedly connected to a second lower illumination segment, the second upper illumination segment and the second lower illumination segment each have a plurality of LEDs;
   the first separable lamp head connected to the first support arm and movable in a plurality of axes relative to the mounting base;
   wherein the plurality of axes are at least a first axis and a second axis which are substantially orthogonal to each other;
   the second separable lamp head connected to the second support arm and movable in a plurality of axes relative to the mounting base;
   wherein the plurality of axes are at least a first axis and a second axis which are substantially orthogonal to each other;
   the first separable lamp head having a first multi-axis hinge interposed between the first upper illumination segment and the first lower illumination segment;
   the second separable lamp head having a second multi-axis hinge interposed between the second upper illumination segment and the second lower illumination segment;
   the first multi-axis hinge having an x-axis hinge and a y-axis hinge;
   the second multi-axis hinge having an x-axis hinge and a y-axis hinge;
   wherein the first lower illumination segment rotates up to at least about 180 degrees relative to the first upper illumination segment about a first axis and wherein the first lower illumination segment rotates up to at least about 15 degrees relative to the first upper illumination segment about a second axis.

2. The security light of claim 1 wherein the second lower illumination segment rotates up to at least about 180 degrees relative to the second upper illumination segment about a first axis and wherein the second lower illumination segment rotates up to at least about 15 degrees relative to the second upper illumination segment about a second axis.

3. The security light of claim 1 wherein the first separable lamp head is connected to the first support arm with a casing retaining a ball joint.

4. The security light of claim 3 wherein the first separable lamp head is connected to the first support arm with the casing formed on the first upper illumination segment.

5. The security light of claim 1 wherein the second separable lamp head is connected to the second support arm with a casing retaining a ball joint.

6. The security light of claim 5 wherein the second separable lamp head is connected to the second support arm with the casing formed on the second upper illumination segment.

7. The security light of claim 1 wherein the first upper illumination segment and the first lower illumination segment each have a non-rectangular lens over the plurality of LEDs.

8. The security light of claim 1 wherein the second upper illumination segment and the second lower illumination segment each have a non-rectangular lens over the plurality of LEDs.

9. The security light of claim 1 wherein the mounting base is configured to be mounted and electrically connected to a junction box.

10. The security light of claim 1 wherein the sensor head is mounted to the mounting base.

11. The security light of claim 1 wherein the sensor head is electronically connected to the mounting base by a wireless connection.

12. The security light of claim 1 wherein the first upper illumination segment and the first lower illumination segment are non-rectangular.

13. The security light of claim 12 wherein the first separable lamp head is substantially rectangular when the first upper illumination segment and the first lower illumination segment are positioned in a predefined adjacent combined position.

14. The security light of claim 1 wherein the second upper illumination segment and the second lower illumination segment are non-rectangular.

15. The security light of claim 14 wherein the second separable lamp head is substantially rectangular when the second upper illumination segment and the second lower illumination segment are positioned in a predefined adjacent combined position.

16. A configurable security light comprising:
a mounting base electronically connected to a sensor head;
a first and second support arm extending from the mounting base;
a first separable lamp head affixed to the first support arm and a second separable lamp head affixed to the second support arm;
the first separable lamp head having a first upper illumination segment hingedly connected to a first lower illumination segment;
the first upper illumination segment and the first lower illumination segment each have a plurality of LEDs;
the second separable lamp head having a second upper illumination segment hingedly connected to a second lower illumination segment;
the second upper illumination segment and the second lower illumination segment each have a plurality of LEDs;
wherein the first lower illumination segment rotates relative to the first upper illumination segment at least about 180 degrees;
wherein the second lower illumination segment rotates relative to the second upper illumination segment at least about 180 degrees.

17. A configurable security light comprising:
a mounting base electronically connected to a sensor head;
a first and second support arm extending from the mounting base;
a first separable lamp head affixed to the first support arm and a second separable lamp head affixed to the second support arm;
the first separable lamp head having a first upper illumination segment connected to a first lower illumination segment;
the first upper illumination segment and the first lower illumination segment each have a plurality of LEDs;
the second separable lamp head having a second upper illumination segment connected to a second lower illumination segment;
the second upper illumination segment and the second lower illumination segment each have a plurality of LEDs;
wherein the first lower illumination segment rotates relative to the first upper illumination segment at least about 180 degrees about a first axis and pivots relative to the first upper illumination segment about a second axis;
wherein the second lower illumination segment rotates relative to the second upper illumination segment at least about 180 degrees about the first axis and pivots relative to the second upper illumination segment about the second axis.

* * * * *